E. J. JERZMANOWSKI.
APPARATUS FOR THE MANUFACTURE OF HEATING AND ILLUMINATING GAS.
No. 177,721.  Patented May 23, 1876.
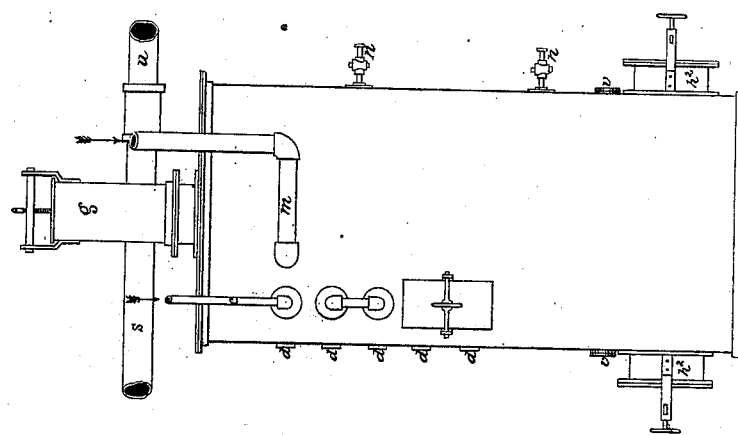
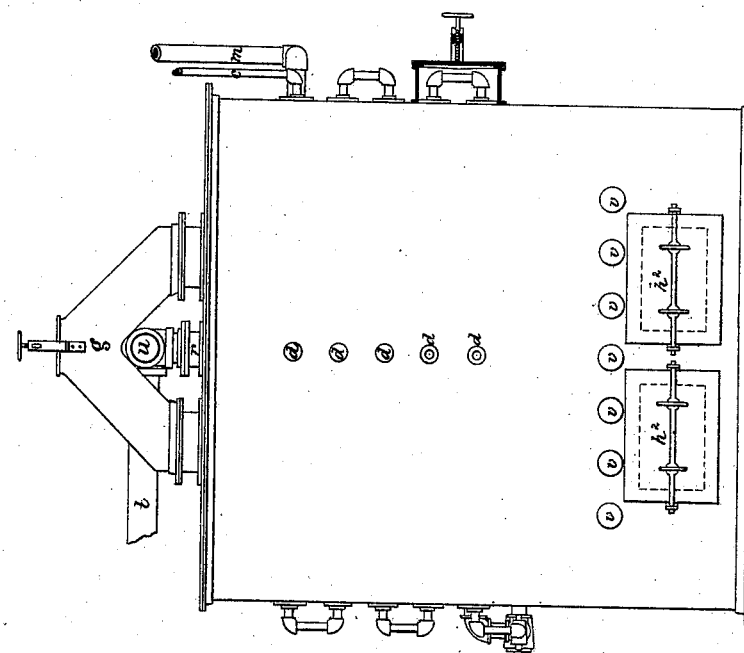

3 Sheets—Sheet 2.
E. J. JERZMANOWSKI.
APPARATUS FOR THE MANUFACTURE OF HEATING AND ILLUMINATING GAS.
No. 177,721. Patented May 23, 1876.
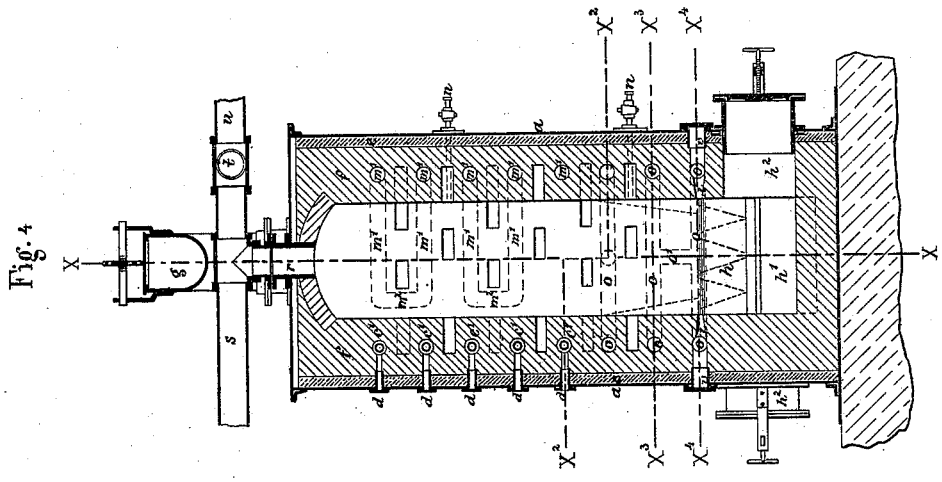
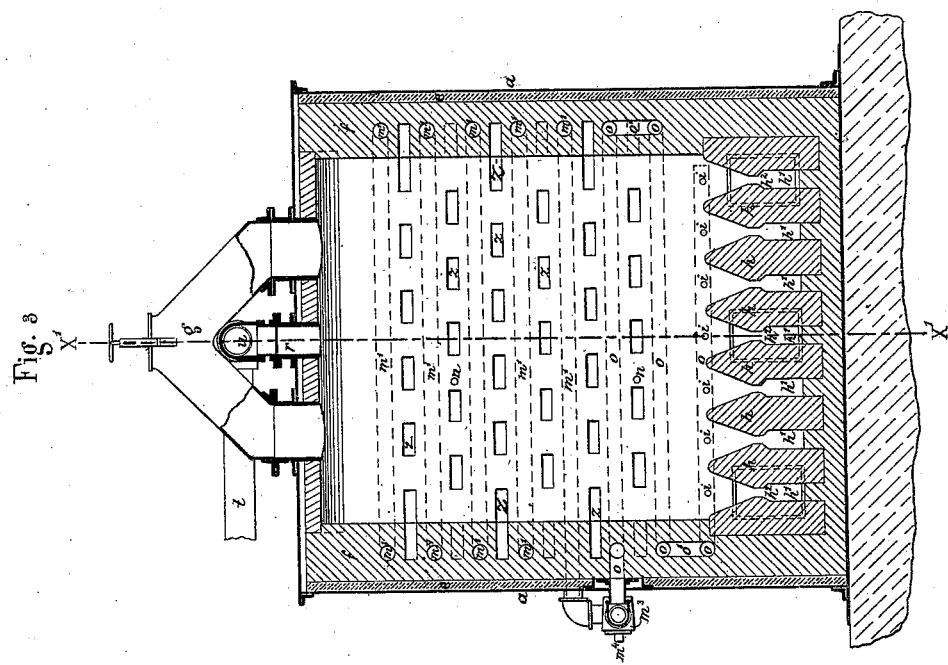
WITNESSES:
INVENTOR:
N. PETERS, PHOTO-LITHOGRAPHER, WASHINGTON, D. C.

3 Sheets—Sheet 3.

E. J. JERZMANOWSKI.
APPARATUS FOR THE MANUFACTURE OF HEATING AND ILLUMINATING GAS.

No. 177,721. Patented May 23, 1876.

WITNESSES: INVENTOR:

UNITED STATES PATENT OFFICE.

ERAZM J. JERZMANOWSKI, OF NEW YORK, N. Y., ASSIGNOR TO EDWARD STERN, OF SAME PLACE.

IMPROVEMENT IN APPARATUS FOR THE MANUFACTURE OF HEATING AND ILLUMINATING GAS.

Specification forming part of Letters Patent No. 177,721, dated May 23, 1876; application filed April 19, 1876.

*To all whom it may concern:*

Be it known that I, ERAZM J. JERZMANOWSKI, of the city, county, and State of New York, have invented certain new and useful Improvements in Apparatus for the Manufacture of Gases for Heating, Illumination, and other purposes; and that the following is a description of my said improvements, reference being had to the accompanying drawings, in which—

Figure 5:
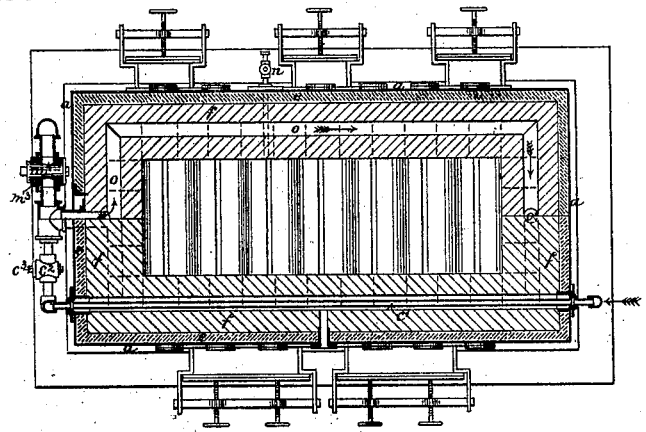
Figure 6:
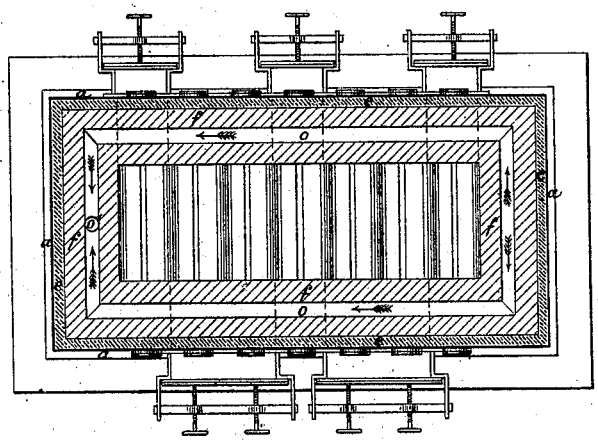
Figure 7:
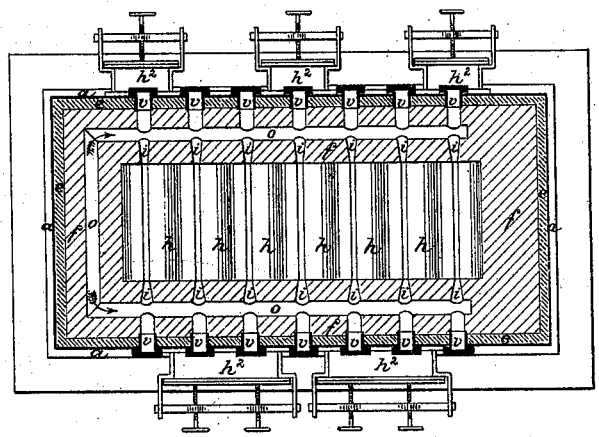

Figure 1 represents, in elevation, one side of a water-gas generator which embodies my improvements. Fig. 2 represents a like view of that end of the generator which is at the right hand in Fig. 1. Fig. 3 represents a vertical longitudinal section through the middle of the generator, at the interrupted lines X X of Fig. 4. Fig. 4 represents a vertical transverse section through the middle of the generator, at the interrupted line $X^1 X^1$ in Fig. 3. Fig. 5 represents a horizontal section at the stepped interrupted line $X^2 X^2$ of Fig. 4. Fig. 6 represents a horizontal section at the interrupted line $X^3 X^3$ of Fig. 4, and Fig. 7 represents a horizontal section at the interrupted line $X^4 X^4$ of Fig. 4.

The same symbols (mostly letters of the alphabet) refer to the same parts in all the figures.

My invention has for one of its objects the more effectual and economical heating to a high temperature of the air and steam, which are alternately forced into the decomposing-chamber of the generator, and through the bed of ignited coke with which that chamber is filled; and this branch of my invention consists in so arranging the flues and pipes for conducting the air and steam to the generating-chamber that they shall severally traverse its walls or lining to be heated by the heat of the lining, and, in turn, heat the steam or air passing through them. By thus constructing and arranging the pipes and the chamber to make one fire suffice for heating the air and the steam and the generation of the gases, and admit of the compact inclosure of the whole in a common casing, the losses from radiation, percolation, and joint leakage are much lessened.

My invention further consists in so constructing and arranging the heating-pipes and tuyeres that the steam and the air will be separately and simultaneously heated in separate ducts, flues, or pipes until rendered moderately hot, and then alternately passed through terminal ducts or pipes of higher temperature and common to both, to raise them to the highest temperature required, and deliver them also in alternation through common tuyeres, also highly heated, into the generating-chamber. In this way both the air and steam enter the generator at the maximum temperature to which they are raised, thus avoiding the loss of heat which would result from passing through a duct between the heating apparatus and the gas-generating chamber.

Another object of my invention is to bring the steam and coke into contact within the chamber under conditions more favorable than heretofore to the rapid production of hydrogen, oxide of carbon, and light carbureted hydrogen—the products desired and less favorable to the production of carbonic acid, which is injurious; and this branch of my invention consists in constructing the bottom of the generating-chamber in a series of cones, pyramids, ribs, or ridges, with channels between them, and of such size, shape, and arrangement as to uphold the coke, while keeping a large part of the area of its under surface exposed to the alternate action of the steam and air, and permitting the ashes formed by its combustion to be scoured off by the currents of air and steam, and let drop into the channels between the ribs. In this way a clean surface of coke is always presented to the steam and air to quicken the reactions between them, diminish the time needed for the flow of air to renew the heat of the coke and the chamber, decrease the consumption of coke as fuel, lessen the production of carbonic acid, and increase the product and the purity of the useful gases aforesaid.

To render more certain and effective the heating of the pipes and flues for the air and steam in the upper portion of the lining of the generating-chamber, I have formed a series of depressions, indentations, or cells, $z$, in the inner side of the lining, to allow the heat from the coke to radiate nearer to the pipes and flues, and thereby heat them, and the air and steam passing through them, more readily, the lower portion of such indentations being preferably sloped, so that dust, ashes, and bits of coke may be less liable to lodge thereon.

In the drawings I have shown a generator of good proportions, which is of oblong rectangular form internally, of a height somewhat greater than its length, and of a length a little more than three times its width, having a stout iron casing or shell, $a$, on its sides, lined with a layer, $e$, of sand or other suitable non-conducting material, inside of which the lining-walls $f$ are built, of refractory fire-bricks. The top of the chamber is arched, that the lining may retain its place more firmly. The space inclosed by the lining-walls forms a chamber, to be filled with suitable ignited carbonaceous matter, as coke, charcoal, or wood, whose combustion is stimulated by a current or currents of heated air forced through it under pressure, to raise the temperature of the chamber and fuel to a white heat. Under the reactions produced between the air and fuel a large volume of mixed nitrogen, carbonic acid, and carbonic oxide are formed. After the temperature of the chamber and fuel are thus raised, the air is shut off and steam admitted in its place, and flows through until the temperature is reduced to about a red heat, when air is readmitted to again stimulate the combustion and raise the temperature, when the steam is readmitted, and so on indefinitely. The reactions between the fuel and steam evolve hydrogen, oxide of carbon, and some light carbureted hydrogen.

A feeding-hopper, $g$, having a gas-tight door or lid, is placed on the top of the generator, with two tubular discharging spouts or legs, that terminate in openings midway between the middle and ends of the chamber, for the more even distribution of the coke within the chamber.

Instead of the branched hopper, several distinct hoppers, each having its own cover, may be arranged on the top of the chamber. The fuel in the hopper rests upon that in the chamber below, and descends by gravitation, to compensate the consumption within the chamber, which thus is kept constantly full. The capacity of the hopper should be sufficient to supply the consumption of the generator for some determined time—say, two, four, or six hours—at the end of which time it should with regularity be refilled. The bottom of the chamber is fitted with a series of transverse ribs, $h$, made of fire-clay or other suitable refractory material. The outlines of the cross-sections of these ribs, as seen in Fig. 3, resemble a row of blunt spear-heads.

The rounded tops of the ribs afford sufficient support to the superincumbent coke, which generally, under the influence of the blast of air and steam entering from the tuyeres $i$, forms arches over the gutters between the sloping sides of the ribs, from which arch the ashes drop freely through narrow slits between the ribs into the spaces $h^1$ beneath. When the arches happen to break down, the pieces of fuel are arrested by the convergence of the sloping sides of the ribs, so that very little is lost by falling unconsumed among the ashes. The ashes are withdrawn daily, or at other convenient intervals, through openings $h^2$, fitted with gas-tight caps or doors. These openings also give access to the channels between the ribs, for the removal of slag or other obstructive matter that may there be lodged. The air is brought from the blower which supplies it, through the pipe $m$, to the heating-flues $m^1$ in the lining-walls of the chamber. These flues may be of brick or fire-clay, unlined, or they may be lined with sheet metal, preferably copper. I deem it, in many cases, better to line the flues, especially if the flue-walls have a tendency to crack, as the escape of air through a crack into the upper part of the chamber would be injurious. These air-pipes traverse the walls on three sides of the chamber from the top downward, winding back and forth through the horizontal pipes $m^1$ and the short vertical pipes $m^2$, which connect the vertical pipes, until the pipe $m^1$, about half-way between the top and bottom of the chamber, passes to the outside of the shell, and terminates in a valve-chest, $m^3$, Fig. 5, fitted with a valve, $m^4$, which, when opened, permits the air to flow into the horizontal flues $o$, connected by vertical pipes $o'$, all formed in or embedded in the lower half of the lining-walls of the chamber. The horizontal flues $o$ extend all round the chamber, and the lowermost of them, which is on a level with the top of the ribs for supporting the coke, is fitted, on the two opposite sides of the furnace, with a series of tuyeres, $i$, one tuyere being placed opposite each end of each of the troughs between the ribs, and on a level, or thereabout, with the tops of the ribs. If placed lower, or so as to blow directly upon the surface of the ribs, there would be too great a tendency to melt into slag the débris of the fuel resting thereon, and form adherent accumulations, that would obstruct the discharge of ashes and cinders, hinder the working of the fire, and retard and render irregular the decompositions, upon which the generation of gas depends. The aggregate area of the orifices of the tuyeres $i$ should, preferably, be made somewhat less than the area of a cross-section of the pipe $o$, from which they lead, that the air and steam may be discharged from them under pressure between the ribs, and in jets, for the purpose of more thoroughly distributing the same through the coke, and at the same time agitating the ashes generated on the surface of the coke as the residuum of its own combustion, and blowing them off, that they may drop into the ash-pits between the ribs. This agitation also stirs up the ashes and small pieces of cinder, which tend to settle on the sloping sides of the ribs, and cause them to slide down into the ash-holes.

If it is found advisable, the lower series of heating-flues might also be lined with metal; but any leakage through cracks in these flues would do little or no harm, as the stratum of incandescent fuel through which the leaking steam or air would have to pass would be thick enough to decompose it before it reached the egress-valve in the top of the chamber. The steam is brought from the boiler which produces it to the gas-generator by a pipe, $c$, Figs. 1 and 2. This pipe is connected with a heating-pipe, $c^1$, traversing the flues in the upper part of the lining-wall of one side of the generating-chamber. The pipes $c^1$ may either be of iron or of iron lined with copper, or made wholly of copper. These heating-pipes $c^1$ traverse the wall back and forth until they terminate in the valve-chest $c^2$, Fig. 5, on the outside of the shell. This chamber is fitted with a valve, $c^3$, which, when opened, permits the steam heated in the pipes $c^1$ to pass into the flues $o$, in which it is further heated, and conveyed to the tuyeres, through which it is discharged into the generating-chamber.

The valve-chests $c^2$ and $m^3$, with their connecting-pipes on the outside of the chamber, should be protected by a movable insulating-cover against loss of heat by radiation, to prevent the cooling of the heated air and steam within them while passing from the heating-pipes in the upper part of the walls to the flues $o$ below. So, also, should all the outside connections of the heating-pipes be protected. These connections are made on the outside, so that any one of the pipes can be taken out for inspection or repairs without disturbing any of the others. Eye-holes $d$, closed with caps, are formed in the shell and lining of the generator for the convenient inspection of the flues. The side of the generator is also pierced with other eye-holes, $n$, fitted with valves, to admit of the convenient inspection of the interior of the generator while at work.

At the top of the generator there is a short pipe, $r$, which may be regarded as an extension of the chamber. The top of this pipe connects with three lateral pipes, $s$, $t$, and $u$, the entrance to each of which is fitted with a valve by which it may be opened or closed. The branch-pipe $s$ is for the purpose of discharging the gases generated while the flow of air into the chamber continues. The branch pipe $u$ is for the purpose of discharging the gases generated while the flow of steam into the chamber continues. When the pipe $s$ is open the pipe $u$ is closed, and vice versa. The branch pipe $t$ is for the discharge of the gases during the process of purging the generating-chamber for an instant, at the times when the flow of air or of steam into the generating-chamber begins.

The purge-valve and pipe would be better separated from the others, and of much larger cross-section, and each of these valves would be better if arranged in a separate pipe leading from the top of the chamber between the fuel-hoppers.

The ribs $h$, as shown in the drawings, are each about one-sixth of the height and two-fifths of the width of the chamber. I have found these proportions to work effectively; but as a matter of course they might be made either larger or smaller, and still secure, in a large measure, the advantages which result from their form, arrangement, and proportions with respect to the other parts of the apparatus. The angle at which the upper sides of the ribs stand to the vertical is that which I found the sides of a cone of coke as seemed when formed by coke falling vertically from a spout at the apex of the cone, the lumps of coke being of the size which I commonly use in the generator.

If the ribs were interrupted transversely by notches or spaces of the same form and proportions as those by which they are separated, they would then form rows of pyramids of the same transverse section of the ribs, and the fuel would rest on their blunt tops or knobs. If the ribs were thus replaced by pyramids or cones, the spaces between the rows would be narrower than those between the ribs, to multiply the points of support for the fuel sufficiently to keep it up.

The ribs for upholding the coke perform that duty effectively, and at the same time present a far more open and clean under surface of coke for the air and steam to act upon, and secure a far more complete and ready separation and discharge of the ashes, than the diaphragm-grates and perforated bottoms heretofore employed for generating-chambers.

I have shown the air and steam passing through separate heating-pipes for a portion of the distance which they traverse between the top and the bottom of the generator; but the common pipe for heating, when in alternation, may commence higher up, or even at the top of the walls of the chamber, at which point the valve-chest should in that case be placed.

What I claim is—

1. The combination of pipes or ducts for air and steam with the walls of the generating-chamber, having recesses $z$, so that a single fire may more effectually suffice for heating the air and the steam, and for generating the gas, substantially as described.

2. The combination of inlet-valves, heating flues or pipes, and discharge-nozzles or tuyeres, with the lining of the generating-chamber, whereby the air and steam are passed alternately through a hot duct to heat them to the temperature required, and delivered directly into the generating-chamber, substantially as described.

3. The bottom of the generating-chamber, constructed with refractory ridges or knobs for supporting the fuel, and forming receptacles for ashes, substantially as described.

4. The combination of the air and steam tuyeres with ridges or knobs in the bottom of the chamber, for supporting the fuel, and intervening troughs to receive the ashes, whereby the air and steam are blown along the spaces between the supports, so as to scour the ashes from the fuel, and promote chemical reactions in the chamber, substantially as described.

ERAZM J. JERZMANOWSKI.

Witnesses:
 E. STERN,
 P. H. WATSON.